US006553743B1

(12) United States Patent
Makutonin et al.

(10) Patent No.: US 6,553,743 B1

(45) Date of Patent: Apr. 29, 2003

(54) ROTARY KNIFE AND TRANSFER APPARATUS

(75) Inventors: Boris E. Makutonin, Cincinnati, OH (US); Frank G. Oliverio, Cincinnati, OH (US); Matthew J. Zdinak, Florence, KY (US)

(73) Assignee: R.A. Jones & Co. Inc., Covington, KY (US)

(*) Notice: Subject to any disclaimer, the term of this patent is extended or adjusted under 35 U.S.C. 154(b) by 383 days.

(21) Appl. No.: 09/228,856

(22) Filed: Jan. 12, 1999

(51) Int. Cl.[7] .............................................. B65G 47/26

(52) U.S. Cl. .......................... 53/475; 53/443; 198/428; 198/431

(58) Field of Search .......................... 53/435, 443, 475; 198/428, 431

(56) References Cited

U.S. PATENT DOCUMENTS

| | | | | |
|---|---|---|---|---|
| 3,597,898 A | | 8/1971 | Cloud | |
| 3,822,008 A | * | 7/1974 | Benner, Jr. et al. | 198/35 |
| 3,961,697 A | | 6/1976 | Hartman et al. | |
| 4,585,113 A | * | 4/1986 | Greenwell | 198/347 |
| 4,872,382 A | | 10/1989 | Benner, Jr. et al. | |
| 5,220,993 A | | 6/1993 | Scarpa et al. | |
| 5,222,422 A | | 6/1993 | Benner, Jr. et al. | |
| 5,575,187 A | | 11/1996 | Dieterlen | |
| 5,579,894 A | | 12/1996 | Glazier et al. | |
| 5,784,855 A | * | 7/1998 | Focke et al. | 53/53 |
| 5,887,700 A | * | 3/1999 | Priuli | 198/418.6 |

* cited by examiner

*Primary Examiner*—Eugene Kim

*Assistant Examiner*—Christopher Harmon

(74) *Attorney, Agent, or Firm*—Wood, Herron & Evans LLP

(57) ABSTRACT

A pouch knife and transfer apparatus has two discharge points where severed pouches are discharged onto separate conveyors with one of the conveyors being a direct drop conveyor. Such direct drop conveyor operates initially in a direction perpendicular to the axis of rotation of the knife or to the axis of rotation of the transfer wheel feeding the conveyor. The other conveyor may be a direct drop conveyor or any other form of a conveyor. Methods are disclosed.

33 Claims, 4 Drawing Sheets

ROTARY KNIFE AND TRANSFER APPARATUS

FIELD OF THE INVENTION

This invention relates to the production handling of pouches and, more specifically, to an improved rotary knife and transfer apparatus used in connection with a pouch form, fill, and seal machine, the knife capable of severing pouches from a pouch train and selectively discharging pouches for downstream cartoning or other packing or handling.

BACKGROUND OF THE INVENTION

In typical pouch machines, a flat web of heat sealable material is continuously fed from upstream of the pouch machine and longitudinally folded upon itself by a plow or similar device. In this form, the thus-folded web is fed about a sealer which contacts the folded web along vertical heated land areas to form transverse vertical seals, and, thus, a series of open-top pouches along the web. The web of open-top pouches is passed around a filler wheel, filled with product and then sealed along the top edge of the web. The web of filled pouches then passes downstream to a motor-driven rotary knife apparatus which cuts the web along the transverse vertical seals into separate individual pouches and deposits them onto a transfer for subsequent cartoning or other secondary packaging.

In one earlier system, pouches are dropped directly from the rotary knife onto a conveyor parallel with the rotary knife axis and feeding a downstream cartoner or hand packer, for example. In another earlier system, pouches are transferred to a courier or transfer wheel which feeds a conveyor operating perpendicular to the rotary knife axis for conveying pouches to a downstream cartoner. This is frequently referred to as a "direct drop" system and where the conveyor comprises buckets for receiving stacks of pouches, the conveyor as described is a direct drop bucket conveyor. It should be understood then that a direct drop conveyor could be a bucket conveyor or some other form of direct drop conveyor so long as it operates perpendicular to the rotary knife or wheel axis. In further known configuration, pouches have been dropped from both knife and transfer wheel onto two separate conveyors, parallel to the rotary knife axis, for feeding downstream cartoners wherein both conveyors operate in directions parallel to the axes of rotation of the knife and transfer wheel. These are typically not referred to as direct drop conveyors.

Prior high volume throughput packaging systems use two or more cartoners. These cartoners are typically fed by pouch systems each having a separate rotary knife for each cartoner. For example, where pouches are to be cartoned automatically, a transfer wheel is used to transfer cut pouches from a knife hub directly drop pouches in conveyor buckets feeding the cartoners. On the other hand, when pouches are shingled or to be hand-packed, they are dropped onto a shingle conveyor as noted above by the rotary knife hub itself. The limitations of these two different systems are significant.

But first, a further brief background will be helpful in appreciating the invention. It will be appreciated that past rotary knives have both major and minor knife hubs, each operating about a respective axis of rotation with each axis being parallel to the other. Examples of this configuration are disclosed in U.S. Pat. Nos. 3,597,898; 3,961,697; 4,872,382; 5,220,993; 5,222,422; and 5,575,187, each of which are herewith expressly incorporated herein by reference.

When a transfer wheel is used with such a knife, it too operates about another respective axis of rotation which is also parallel to the respective axes of rotation of the major and minor knife hubs. One prior example of such a transfer wheel apparatus is disclosed in U.S. Pat. No. 5,220,993 which is also herewith expressly incorporated herein by reference.

Pouch drop off from the major knife hub onto a conveyor operating perpendicular to the aforementioned axes of rotation is illustrated at least in U.S. Pat. Nos. 4,872,382 and 5,222,422, while pouch drop off from the major knife hub to a conveyor (other than a direct drop conveyor as defined herein) operating parallel to the respective axes of rotation is illustrated in at least U.S. Pat. No. 3,961, 697. Pouch drop off from a transfer wheel to a conveyor operating parallel to the axes of rotation is illustrated in at least U.S. Pat. No. 5,220,993.

As noted above, a further embodiment where pouches are dropped from both a major knife hub and a transfer wheel onto two separate single or multiple lane conveyors operating parallel to the aforesaid axes of rotation is also known. Where pouches are dropped from either knife hub or transfer wheel onto a conveyor parallel with their axes of rotation, the pouches are typically dropped in singled or shingled orientation for downstream hand packing or other pouch handling and orientation before packing.

Throughout this application, references are made to the direction of operation of conveyors or the direction of transport of pouches thereon. This refers to the direction of the operation of the conveyor as it receives pouches from the drop off point of a knife hub or transfer wheel, and not necessarily to any later direction of the conveyor which may be otherwise directed.

In most high speed cartoning systems, it is desirable to directly drop pouches onto a direct drop conveyor such as into a bucket of a bucket conveyor to form a select count pouch stack which is then inserted by a cartoner into a carton in a single or multiple stack format. Such a conveyor is most conveniently operated in a direction perpendicular to the axes of knife and transfer wheel orientation to facilitate dropping a select count of pouches into each bucket. Thus the duration of operative movement of such buckets is in the same direction pouches are ejected from the knife or transfer wheel. This permits pouches to be easily stacked on the conveyor and perhaps even more speed or throughput than where pouches are dropped onto a non-direct drop conveyor operating in parallel with knife or transfer wheel axis. In such a case, the direction of pouch travel is changed 90 degrees between its motion on knife hub or wheel and its conveyed motion and the duration of any target location of the conveyor under the knife or wheel in an operable or drop area is shorter than with the other conveyors operating perpendicularly to the axes of rotation. Such conveyors are thus not generally capable of producing pouches in desired stack counts and may be slower than higher conveyor speeds desired where multiple count pouch stacks are to be handled in an automated cartoner.

Of perhaps most significance, however, is the desire to use a direct drop conveyor to produce stacks of pouches and eliminate the need to have downstream transfers or other orienting devices. Where pouches are dropped onto conveyors moving in directions parallel to the knife or wheel axes of rotation, further downstream equipment is necessary to handle, combine or orient them for final packing. This requires more equipment, more complexity and more floor space, and may slow the overall throughput.

Morever, another difficulty inherent in such non-direct drop conveyors is the waste of pouches or product. When a system is stopped, or even slowed, there exists a number of pouches on the conveyor between the knife and the downstream pouch handling or cartoning apparatus. It is difficult to keep track of the number or position of these pouches, particularly when shingled, and they are frequently rejected or wasted in the subsequent start up. The waste of "work in progress", i.e. pouches, is undesirable and it is desired to be able to make any changeover or handling any system slow down or stop without wasting work in progress.

In this regard, it will be appreciated that the direct drop conveyor significantly reduces the aspect of wasted work in progress. Since the pouches are dropped directly into stacks on the direct drop conveyor, they are useful and need not be wasted; they can be packed without additional downstream transfer equipment, as contrasted to the uncertain handling of indeterminate pouches on a non-direct drop conveyor moving through downstream transfer equipment. In other words, the direct drop conveyor provides the advantage of increasing the speed of diversion of pouches between the knife and a cartoner.

It will also be appreciated that only one lane of pouches is produced onto conveyors operating perpendicular to the axes of rotation, the conveyor being in the same operational plane as the knife hub or wheel, and the single lane conveyor may not lend itself to feeding cartoners or current multiple lane equipment. Thus, direct drop conveyors are highly useful in producing stacks of pouches and without downstream transfer or additional handling equipment to place pouches into the desired stacks.

Generally cartoners of today's design are gaining in speed, approaching, but still well under, 1000 pouches per minute. Many new pouch machines are approaching that speed, such as applicant's own PK4000 brand pouching equipment. In considering a pouch production operation of both pouch manufacturing and pouch cartoning, it is desirable to have a throughput as fast as possible. Nevertheless, a faster pouch machine will overload a slower cartoner and thus the cartoning operation currently becomes the weak link in the system from a throughput standpoint. And in terms of cost and complexity where the knife discharges pouches onto a conveyor operating parallel to the knife axis, more downstream transfer equipment is needed.

Based on the above background, even the present rotary knife devices feeding cartoners thus appear to present an obstacle to the desired operational throughput. Even where such knives have two pouch discharge points, this only occurs onto conveyors operating in parallel with the knife or transfer wheel axes and not with direct drop conveyors conveying multiple count pouch stacks. While the volume throughput of such operations in many, if not all, cases may be insufficient to accommodate the output of the faster pouching machines even where two cartoners are fed by such knife apparatus, the use of non-direct drop conveyors requires additional transfer and pouch orienting equipment if multiple pouch packaging is desired.

In the past, it has been common practice to use a single dedicated knife apparatus feeding a single cartoner. This is particularly true when a "direct drop" pouch transfer has been desired, such as by a transfer wheel depositing pouches into a bucket conveyor operating in a direction perpendicular to the transfer wheel's axis of rotation. This has produced the best throughput operation so far without downstream transfer apparatus, but has still several operational limitations.

For example, when the pouch machine output is changed over from an automated cartoner to a shingled pouch cartoning operation, or vice-versa, the pouch web or bandoleer from the pouch machine must be redirected from one knife to another knife for the different cartoner.

This changeover process requires that the production line be temporarily shut down while the other rotary knife apparatus is threaded with the web of pouches. As can be appreciated this changeover process is costly, reduces production output, and adds to the complexity of the manufacturing process. Furthermore, an upstream festooning device is generally required to take up the slack in the pouch web which is generated when switching from one rotary knife apparatus to another if the pouch machine is not stopped. Finally, the rotary knife apparatus generally use different cutting knives depending on the type of pouch drop and conveyor system used. Consequently, the operator must keep a variety of spare parts on hand to service the different rotary knife apparatuses.

Prior attempted solutions to the knife and cartoner throughput issue have provided only partial help. For example, if the knife production of pouches onto a single conveyor is split downstream, the manufacturer may end up with two or more lanes of pouches but having been split, these are now on expanded centers or locations (i.e. conveyor load densities are split) and additional equipment is needed to recombine or reorient the pouches.

Accordingly, in handling pouches from the pouch machine to the knife and then the cartoner, it is also necessary to keep in mind the limitation of the pouch centers required by the cartoner. To be effective, the knife must produce pouches on the centers or in the densities required by the cartoners or only partial fills will result in the cartons. Thus, where any pouch discharge has been split, or provided by a conveyor orientation not up to the throughput parameters required, the entire system must be slowed and/or additional pouch handling or combining equipment must be added to the handling or packaging line.

Accordingly, a primary objective of the present invention is to provide a single rotary knife and transfer apparatus capable of selectively depositing pouches onto one or more conveyors, where at least one is a direct drop conveyor carrying the pouches to different cartoning machines.

Another object of this invention is to provide a rotary knife and transfer apparatus which provides improved operating flexibility and reduced operating costs.

Another objective of the present invention is to provide a single rotary knife and transfer apparatus capable of selectively depositing pouches onto at least one direct drop conveyor and one or more other conveyors so as to eliminate a festooning of a pouch web or bandoleer when a cartoner is stopped or taken off line.

Another objective of the invention is to provide a pouch knife and transfer having two discharges, at least one onto a direct drop conveyor and wherein waste and downstream handling or transfers are eliminated.

SUMMARY OF THE INVENTION

These and other objects of the invention are provided for by a multiple deposit pouch severing and transfer knife apparatus used in connection with a pouch form, fill, and seal machine and capable of selectively discharging pouches onto a plurality of conveyor systems for different downstream handling devices such as separate or different cartoners or packing stations and wherein at least one of the conveyor systems is a direct drop conveyor, preferably a bucket conveyor, for single or multiple pouch count stacks and operating in a direction perpendicular to the axes of rotation of rotating knife components of the knife apparatus.

In one embodiment, the pouch severing and transfer apparatus has a major rotary pouch knife hub cooperating with two transfer wheels. The rotary pouch knife defines two release stations where pouches are released from the hub onto the respective transfer wheels which have peripheral suction cups operably positioned proximate the periphery of the major knife hub at the respective release stations. Axes of the major knife hub and the wheels are all parallel. The first wheel is disposed at the first release station and the second transfer wheel is operably disposed adjacent to the rotary pouch knife at the second release station. The first wheel transfers pouches to one drop off area over a direct drop bucket conveyor. The second transfer wheel receives pouches at the second release station for transfer to another drop off position feeding a second downstream handling device, preferably another direct drop conveyor, such as a bucket conveyor. Advantageously, the two conveyors are each operably disposed respectively between the rotary pouch knife and the downstream handling devices, each receiving pouches from one of the two transfer wheels and transferring pouches to respective downstream handling devices, and at least one of the conveyors and, in this case, both conveyors, being direct drop conveyors, preferably bucket conveyors. As used in this description, a downstream handling device may be a pouch recombining device, a pouch orientation device, a pouch packing or pouch cartoner or the like.

In another embodiment, the pouch severing and transfer apparatus has a major rotary knife hub cooperating with only one transfer wheel. In this embodiment, the rotary pouch knife is adapted to sever pouches from a pouch train and to carry separated pouches to at least one of at least two release stations located about the major rotary pouch knife hub. At least one transfer wheel is operably disposed adjacent to the rotary pouch knife hub at one of the release stations for receiving pouches at the one release station from the rotary pouch knife and transferring such received pouches to a drop off position from where it is conveyed to one downstream handling device. A second one of the release stations, which is spaced from the first release station, also comprises a drop off point and can release pouches directly from the rotary pouch knife onto a shingled or multiple lane conveyor operating in a direction in parallel to the rotational axes of the knife for transfer to a second one of the downstream handling devices. Advantageously, the pouch severing and transfer apparatus includes two conveyors, one conveyor being a direct drop conveyor, preferably a bucket conveyor, receiving pouches from the transfer wheel and for transferring those pouches to one downstream handling device, and the other conveyor for receiving pouches directly from the rotary pouch knife (not from the transfer wheel) and transferring them downstream in another direction.

Accordingly, in each of these embodiments, the apparatus includes at least one transfer wheel and at least two pouch drop off points or areas disposed operably over at least two take away conveyors, one being a direct drop conveyor operating in a direction perpendicular to the axes of rotation of the knife or transfer wheel feeding the conveyor.

In this way, the knife apparatus has the advantage of at least one direct drop conveyor for efficiently feeding at least one cartoner and a secondary discharge of either another direct drop conveyor, operating in a direction perpendicular to the rotational axes, or a conveyor operating in a parallel direction with respect to the rotational axes and at least carrying other pouches. Thus, the knife is capable of handling the full throughput of the pouching machine by having the capacity to effectively feed that full output through separate discharges to two, or even more, cartoners.

It will be appreciated that the invention contemplates many variations of the basic concept which is a rotary knife apparatus having at least two pouch discharges, at least one of which feeds a direct drop conveyor and the other of which is a second conveyor operating in a parallel direction with the direct drop conveyor or in a direction perpendicular to it. And the knife apparatus itself may preferably comprise a major rotary knife hub, a minor knife hub, at least one transfer wheel and, optionally, two. The direct drop conveyor is preferably a bucket conveyor but may be any other form of direct drop conveyor operating perpendicularly to the axis of the knife or wheel feeding it.

Other embodiments are set forth in the following written description.

Accordingly, the improved knife apparatus according to the invention provides a single knife apparatus where only one pouch train is severed and the pouches can be delivered to at least one or two drop offs for conveyance to at least two cartoners or packing stations or downstream handling devices. It is no longer necessary to provide a single dedicated knife for each cartoner packaging line. Overall throughput is increased, the knife output can be directed more readily to one or both of two cartoners and a manufacturer no longer must spend money on a separate knife for each cartoner line. Pouch train accumulation or festooning due to downstream shut downs or delays is minimized or avoided, as is the need for downstream transfer or handling equipment.

These and other advantages will become readily apparent from the detailed description of preferred and other embodiments of the invention, and from the drawings in which:

DETAILED DESCRIPTION OF THE INVENTION

Figure 1:
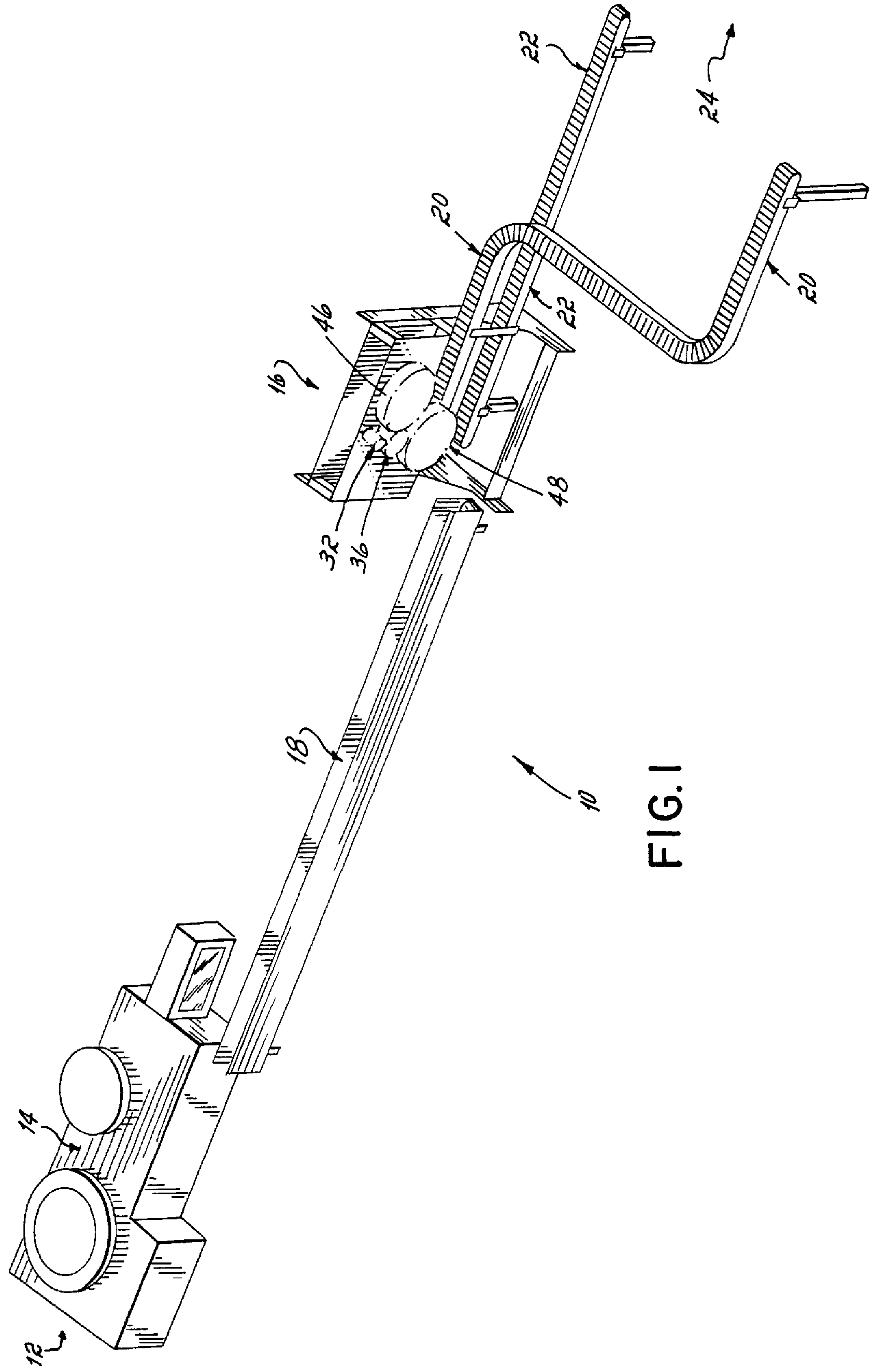
FIG. 1 is a diagrammatic perspective view showing a pouch production line of the type in which a preferred embodiment of the rotary knife and transfer apparatus of the invention is used.

FIG. 1 shows a portion of a pouch assembly and packing line 10 configured to produce individually sealed pouches filled with a wide variety of material, such as foods or other articles or items. The starting end 12 of the pouch assembly line 10 includes a pouch form, fill, and seal machine 14 which generates a continuous web or bandoleer of pouches that are transported to the pouch severing and transfer apparatus 16 by conveyor 18 which may be an accumulating conveyor such as a web festooning conveyor. The pouch form, fill, and seal machine 14 is of conventional design. One such pouch form, fill, and seal machine that could be used with the invention is fully described in U.S. Pat. No. 5,829,332, which is incorporated herein by reference. First and second direct drop transport conveyors 20, 22 carry the severed pouches away from the single pouch severing and transfer apparatus 16 in novel fashion to individual cartoning machines (not shown) positioned at a finishing end or area 24 of the pouch assembly line 10. It will be appreciated that the invention in this embodiment contemplates a single rotary knife apparatus feeding two direct drop bucket conveyors as will be further described.

Figure 2:
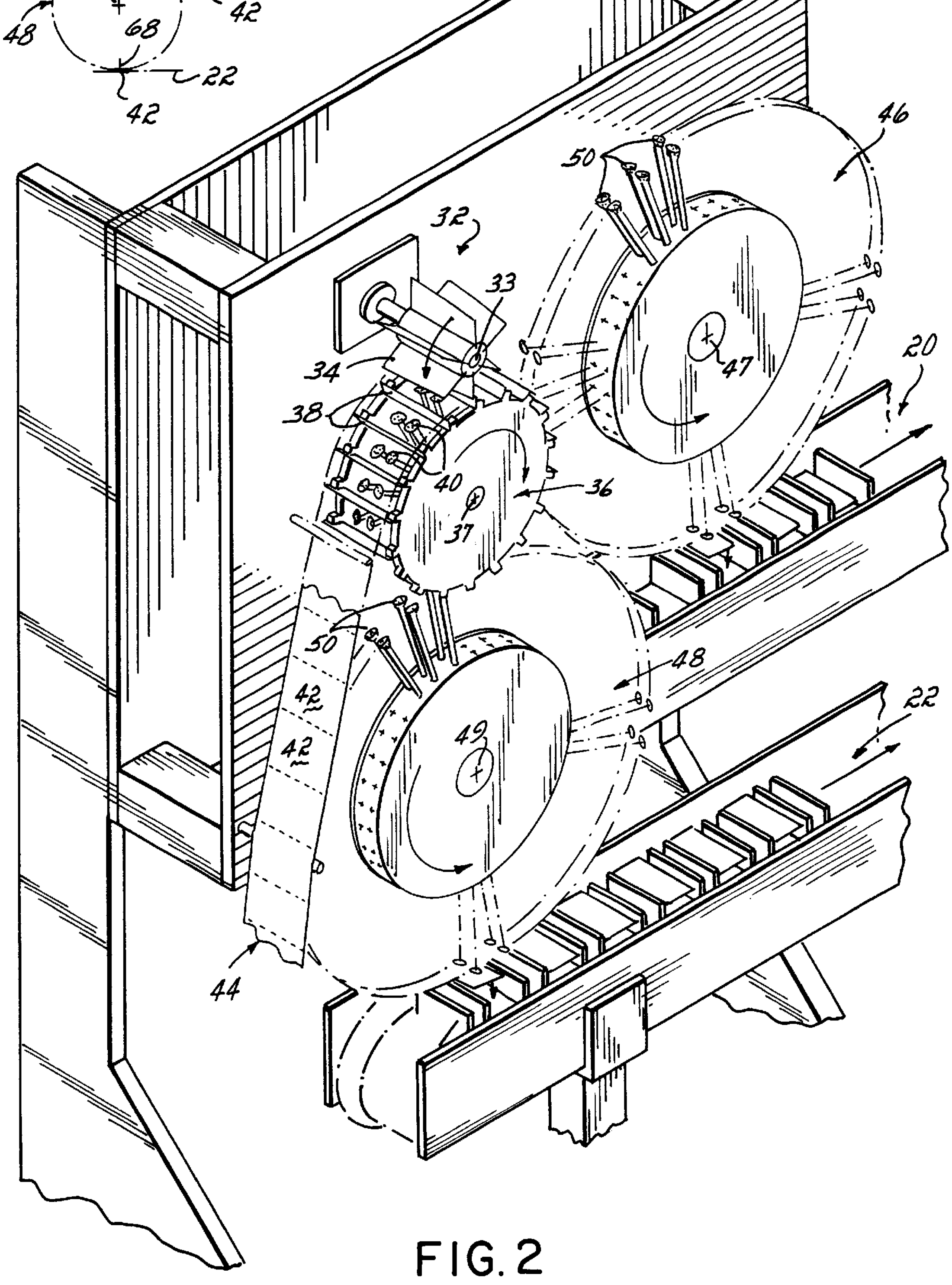
FIG. 2 is a perspective view of the rotary knife and transfer apparatus of the invention of FIG. 1 shown with two transfer wheels.

With reference now to FIG. 2, the pouch severing and transfer apparatus 16 of FIG. 1 has a minor knife hub 32 with a plurality of knives 34 spaced about the minor hub 32. Minor knife hub 32 rotates about an axis of rotation 33. The pouch severing and transfer apparatus 16 also has a major knife hub 36 with a plurality of knives 38 spaced about the major knife hub 36. Major knife hub 36 rotates about an axis of rotation 37.

The major knife hub 36 is positioned relative to the minor knife hub 32 such that the knives 38 of the major knife hub 36 cooperate with the knives 34 of the minor knife hub 32 for separating individual pouches 42 from a continuous web 44 of pouches 42 being generated by the pouch form, fill, and seal machine 14, and as shown in one or more of the aforenoted patents.

Major knife hub 36 further includes a plurality of selectively controllable pouch retention members such as stem-mounted suction cups 40 interposed between the spaced knives 38 for securing pouches 42 from the web 44 to and for rotation with the major knife hub 38. The pouch retention members 40 are also controllable to release the pouches 42 at desired release locations or areas during the rotation of the major knife hub 36.

The pouch severing and transfer apparatus 16 of this embodiment has first and second transfer wheels 46, 48 which are operatively disposed adjacent to the major knife hub 36. Wheel 46 rotates about an axis of rotation 47 while wheel 48 rotates about an axis of rotation 49. At this point, it will be appreciated that knife hubs 32, 36 and wheels 46, 48 are all oriented in the same operative generally vertical plane and that the axes of rotation 33, 37, 47 and 49 are all generally parallel.

Each transfer wheel 46, 48 is selectively controllable and cooperates with the pouch retention members 40 on the major knife hub 36. In particular, the first transfer wheel 46 receives individual pouches 42 released by the pouch retention members 40 after the pouches 42 are separated from the continuous web 44. After receiving the pouches 42, the first transfer wheel 46 later releases those individual pouches 42 onto the first direct drop transport conveyor 20. Similarly, the second transfer wheel 48 receives other individual pouches 42 released by the pouch retention members 40 at a release station and thereafter drops those other individual pouches 42 for transport onto the second direct drop transport conveyor 22. As shown in FIGS. 1 and 2, the first transport conveyor 20 is aligned with and positioned above the second transport conveyor 22 at the pouch severing and transfer apparatus 16. To facilitate multiple downstream cartoning stations, the transport conveyors 20, 22 may later diverge so that they are not aligned with one another at the finishing end 24 of the pouch assembly line 10, but rather feed two different cartoners (not shown).

Preferably, the first and second transfer wheels 46, 48 each include paired pouch retention or stem-mounted suction cup members 50 spaced respectively about the first and second transfer wheels 46, 48. Each suction or cup member 50 is provided selectively with either negative pressure for retaining the individual pouches 42 on the respective suction members 50 or with positive pressure for releasing the individual pouches 42 from the respective suction members 50.

In one embodiment the pitch or pouch centers on wheels 46, 48 are about 5 inches for one particular size of pouch. Each wheel preferably then has a pair of suction cups 50 at every five inches along the wheel's operative periphery. Other ones of these, for example, may be different so that pouches are carried on the wheels 46, 48 on ten inch centers. Speeds of the knives, transfer wheels 46, 48 and conveyors 20, 22 are sufficiently coordinated so that the pouches are deposited onto buckets of conveyors 20, 22 which are filled with pouch stacks of predetermined count.

The rotation of the knife hubs 32, 36 and one of the transfer wheels 46, 48 is adjustable so that one transfer wheel 46, 48 can transfer to its associated transport conveyor 20, 22 a sufficient quantity of pouches 42 so that the associated cartoner speed can be increased to make up for any interruption that may occur in the operation of the other cartoner. For example, if one cartoner is shut down, the other may be fed by a single transfer wheel either at high speed or with pouches on five inch centers to fill the buckets only of the cartoner which is slowed or stopped. Alternately, the pouch machine output rate could be adjusted as well to accommodate downstream delays.

The operation of the pouch severing and transfer apparatus 16 of FIG. 2 is best explained with reference to FIG. 3. The continuous web 44 of pouches 42 is fed between the minor knife hub 32 and the major knife hub 36. The knives 34 of the minor knife hub 32 and the knives 38 of the major knife hub 36 cooperate with one another to define a severing station 60. The pouch retention members 40 apply a negative pressure or suction to secure the web 44 and the severed pouches 42 to the major knife hub 36. After a pouch 42 is severed from the web 44, the pouch 42 is held to the major knife hub 36 by the pouch retention members 40 prior to being transferred to the transfer wheels 46, 48.

To facilitate the transfer of pouches 42 to the transfer wheels 46, 48, the major knife hub 36 has at least two release stations or areas 62, 64 spaced apart from one another. The first release station 62 is defined generally by the tangential intersection of the major knife hub 36 and the first transfer wheel 46, and the second release station 64 is defined generally by the tangential intersection of the major knife hub 36 and the second transfer wheel 48.

At release stations 62 the respective suction member 50 of transfer wheel 46 is provided with a negative pressure or suction to secure the respective pouch from major knife hub 36 onto the transfer wheel 46. At the same time, the respective suction member 50 of the major knife hub 36 is provided with a positive pressure to release the pouch 42. As such, the pouch 42 is transferred from the major knife hub 36 to the first transfer wheel 46 at release station 62. The transfer of pouches 42 at release station 64 is accomplished in a manner substantially equivalent to that of release station 62.

Having received a pouch 42 at release station 62, the first transfer wheel 46 thereafter transports it, then drops the pouch 42 at a drop station 66 into the first transport conveyor 20. Similarly, second transfer wheel 48 drops the pouch 42 at a drop station 68 into the second transport conveyor 22. The wheels 46, 48 rotate in the direction of the arrows on the drawings.

It will be appreciated this embodiment includes a rotary knife component, two transfer wheels and at least two conveyors where at least one of the conveyors, and preferably both, are direct drop conveyors (and in this example, direct drop bucket conveyors) operating in perpendicular directions, initially, to the axes of rotation of the transfer wheels.

It will also be appreciated that this embodiment substantially eliminates waste of work in progress. Changes back and forth between discharges, slowdowns or stoppage can be accommodated very quickly and on the order of 0.25 to 0.50 seconds. This involves only a few pouches (under seven), as opposed to 30 to 100 or more in the slower reacting changeover or slowdown accommodation of non-direct drop transport conveyors.

It will also be appreciated that as used herein, a "direct drop" conveyor is a conveyor moving in a direction perpendicular to the axis of the rotary knife hub or wheel feeding the conveyor.

Figure 3:
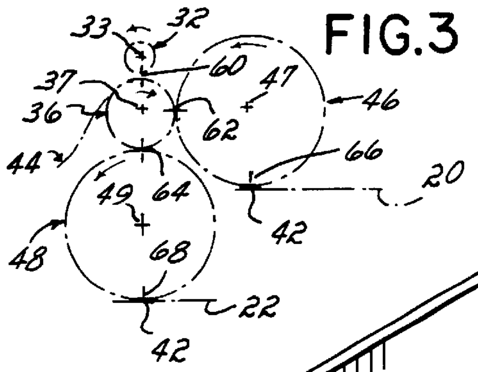
FIG. 3 is a schematic elevational view illustrating the release stations and drop off points for the rotary knife and transfer apparatus of FIG. 2.

In describing the following alternative embodiments, elements like those of the embodiments of FIGS. 1–3 bear like identifying numbers while other or additional features bear new identifying numbers.

Alternative Embodiments

Figure 4:
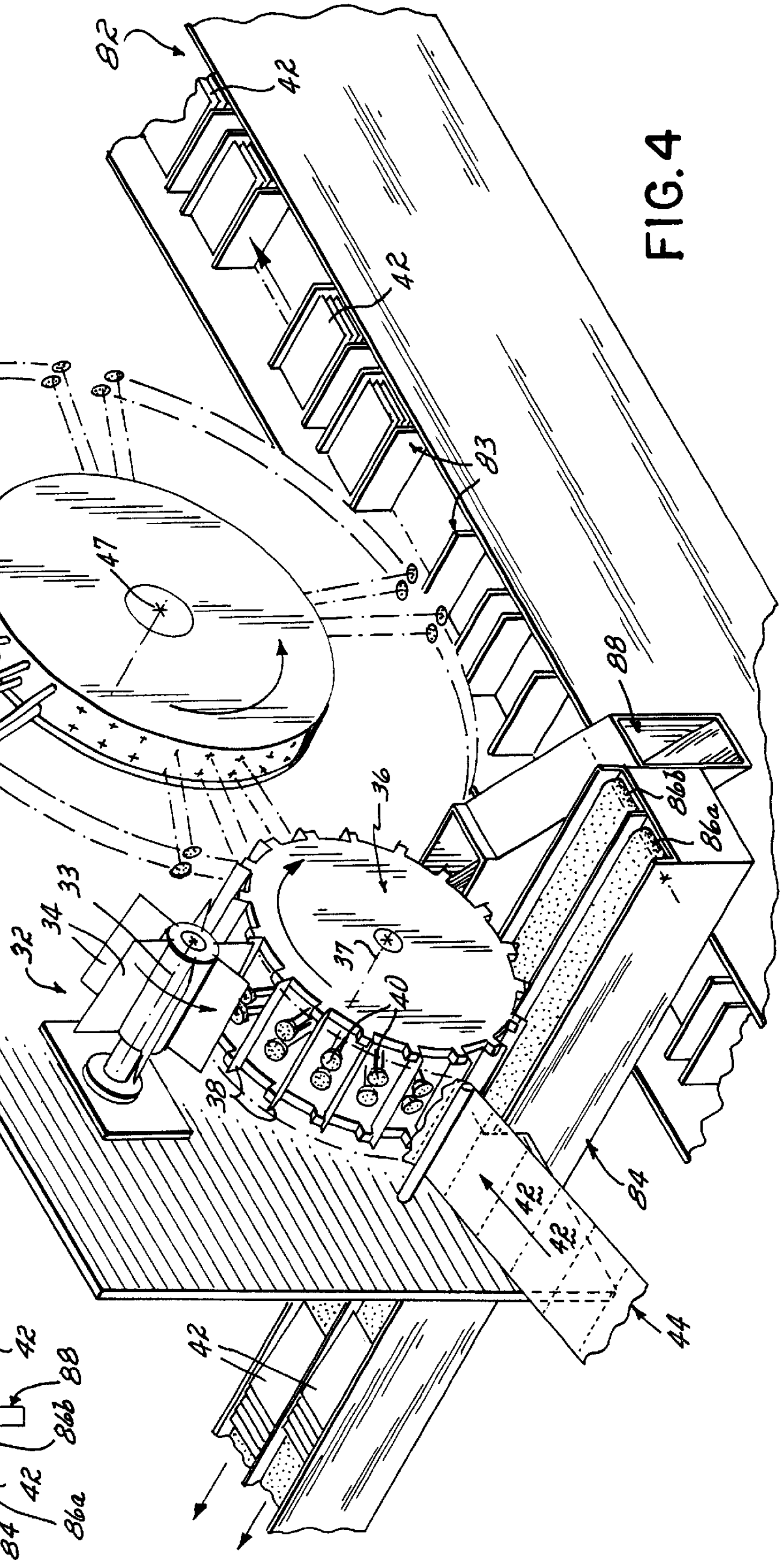
FIG. 4 is a perspective view of the rotary knife and transfer apparatus of another embodiment of the invention with one transfer wheel.

Another embodiment of the pouch severing and transfer apparatus is illustrated at 80 and is constructed in accordance with the principles of the invention as shown in FIG. 4. The pouch severing and transfer apparatus 80 of FIG. 4 is similar in design and operation to the pouch severing and transfer apparatus 16 of FIG. 2, with two major differences. One difference is that the pouch severing and transfer apparatus 80 has only a first transfer wheel 46 and not a second transfer wheel 48. Another difference is that different configuration of the transport conveyors.

The pouch severing and transfer apparatus 80 has the minor knife hub 32, the major knife hub 36, and the transfer wheel 46 oriented in a configuration similar to that of the pouch severing and transfer apparatus 16. As such, the transfer wheel 46 is selectively controllable and cooperates with the pouch retention members 40 on knife hub 36 at one release station for selectively receiving pouches 42 from the pouch retention members 40 and transferring those individual pouches 42 away from the major knife hub 36 for deposit from a drop off point on a first direct drop transport conveyor 82 leading to a first cartoner (not shown). Likewise, the pouch retention members 40 are selectively operable to retain selected severed pouches 42 on the pouch retention members 40 for transfer at a second release station comprising a drop off point, to a second multiple lane transport conveyor 84 leading to a second cartoner (not shown). Preferably, the second transport conveyor 84 has first and second lanes 86*a*, 86*b* for alternatively receiving pouches 42 as required. It is of particular note that the first transport conveyor 82 is oriented for transport motion in a direction perpendicular to the axes of rotation (37, 47) of both the major knife hub 36 and the transfer wheel 46. The second transport conveyor 84 is preferably perpendicular to the first transport conveyor 82 and is parallel to the axes of rotation 37, 47. In other words, the second transfer conveyor 84 is parallel to the axis of rotation of both the major knife hub 36 and of the transfer wheel 46, unlike the apparatus in FIGS. 1–3 wherein both direct drop conveyors 20, 22 are originally both perpendicular to axes 37, 47 and 49.

Because pouches 42 may be inadvertently damaged while being severed by the knives 34, 38, the pouch severing and transfer apparatus 80 includes a reject chute 88 for receiving damaged pouches 42 and depositing them in a waste receptacle (not shown). Such a chute 88, though not shown, may be provided in a suitable area in the apparatus of FIGS. 1–3, or with the various further embodiments.

Figure 5:
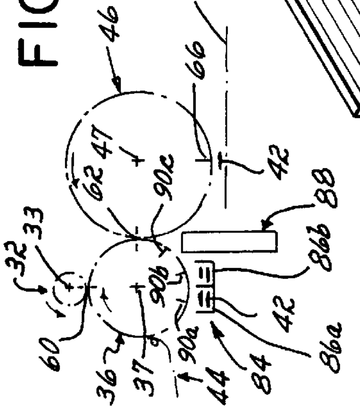
FIG. 5 is a schematic elevational view illustrating the release stations and drop off points for the rotary knife and transfer apparatus of FIG. 4.

The operation of the pouch severing and transfer apparatus 80 of FIG. 4 is best explained with reference to FIG. 5. As stated above, its operation is somewhat similar to that of the pouch severing and transfer apparatus 16 of FIG. 2 but differs in several significant respects. The incoming web 44 is severed into individual pouches 42 at severing station 60. The major knife hub 36, however, has release station 62 at which transfer wheel 46 may selectively receive individual pouches 42 from the major knife hub 36. The pouches 42 received by transfer wheel 46 are dropped at drop station 66 into the first direct drop transport conveyor 82. Those pouches not transferred to transfer wheel 46 are dropped at one of three other drop stations 90*a*, 90*b*, 90*c* depending on the operational requirements. In normal operations, pouches are dropped off at drop stations 90*a*, 90*b* which correspond respectively to lanes 86*a*, 86*b* of second transport conveyor 84. If, however, a pouch 42 is classified as a reject, then it will be dropped from the major knife hub 36 at drop station 90*c* and into reject chute 88.

Moreover, it will be appreciated that the pouches dropped at drop off 66 onto conveyor 82 fall directly into buckets 83 of conveyor 82 and are stacked in each bucket according to a preselected count produced in part by a discharge control (not shown) for wheel 46, the speed of wheel 46 and the relative speed of the buckets 83 of the conveyor 82. Since the pouches, when dropped, are moving in the same direction as buckets 83, multiple pouches can be directly dropped onto conveyor 82 (similar to conveyor 22) at relatively high speeds.

Looking now at conveyor 84, it will be appreciated that pouches dropped off knife hub 36 are moving in a transverse direction to the transport motion of conveyor 84. As such, the target range of conveyor 84 with respect to knife hub 36 is short lived and the delivery of multiple pouches to a single location on this conveyor would be relatively and in many cases significantly slower, since the conveyor would have to be slowed. Thus, the pouches are "shingled" on this conveyor, as shown in FIG. 4, and transported to a different cartoner or to stations for hand packing or to stations where further pouch combining or orientation is performed. The general throughput of such a transport and handling operation is useful but inherently relatively slower than that of the operation provided by transfer wheel 46 and direct drop conveyor 82.

It will, of course, be appreciated that conveyor 84 could be a single lane application, a two-lane conveyor as shown, or more than two lanes, assuming a knife-hub control sufficient to drop pouches into one or more lanes. Such a knife drop apparatus and control mechanism are shown in U.S. Pat. No. 3,961,697, 4,872,382 or 5,222,422 herewith incorporated herein by reference.

Accordingly, it will be generally appreciated that this embodiment of the invention includes a rotary knife and transfer apparatus providing two pouch drop off areas onto at least two conveyors where at least one conveyor is a direct drop conveyor, preferably a bucket conveyor.

As is clearly evident from this embodiment and from the preferred embodiment described, the major knife hub 36 may itself be considered to constitute or comprise, at least in part, a pouch transfer apparatus extending at least from the pouch severance point to the release station or the drop off point, depending on the embodiment.

Other Alternate Embodiments

Turning now to the alternative embodiments of FIGS. 6–10, there are illustrative drawings of different embodiments of the knife and transport portions of the invention. Each includes a rotary knife, at least one transfer wheel, at least two pouch drop off areas and at least two pouch conveyors where at least one of the conveyors is a direct drop bucket conveyor. The knife hubs 32, 36 and transfer wheels 46, 48 are like those of the other embodiments and these embodiments differ primarily only in the use of one or two transfer wheels and in the nature and variety of the transport conveyors.

It will be appreciated that in each embodiment described in this application, where one conveyor is a direct drop conveyor, the other conveyor can be of any desired type or function. Also, it will be appreciated that the conveyors' associated positions could be reversed in each embodiment when desired, to receive pouches from either transfer wheel or knife.

Figure 6:
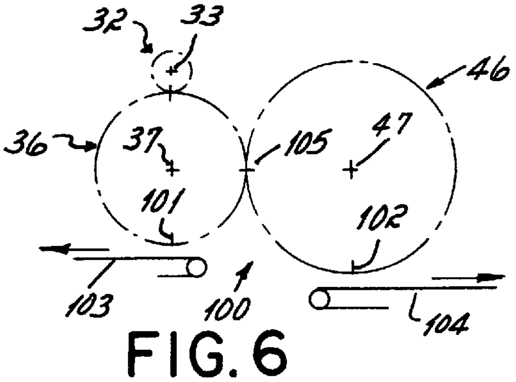
FIGS. 6–10 are schematic elevational views illustrating further alternative embodiments of the invention.

Alternative Embodiment—FIG. 6

FIG. 6 illustrates a rotary pouch knife and transport apparatus 100 including a minor knife hub 32, major knife hub 36 and one transfer wheel 46, these being similar to like numbered components of other embodiments. One pouch release station 105 is provided where cut pouches are released from hub 36 to wheel 46. Two drop off points or stations 101, 102 are provided where cut off pouches are released or dropped onto respective conveyors 103, 104. In this embodiment, each conveyor operates in a transport direction perpendicular to the axes of rotation 33, 37, 47. At least one of these conveyors 103, 104 comprises a direct drop conveyor (a bucket conveyor is preferred) receiving pouches directly for either knife hub 36 or wheel 46 in pre-selected count stacks for transport to a downstream cartoner. Both conveyors 103, 104 could be such direct drop bucket conveyors or one of the conveyors could receive pouches in shingled or single fashion for transport to downstream combining, orientation or packing station or cartoners.

Figure 7:
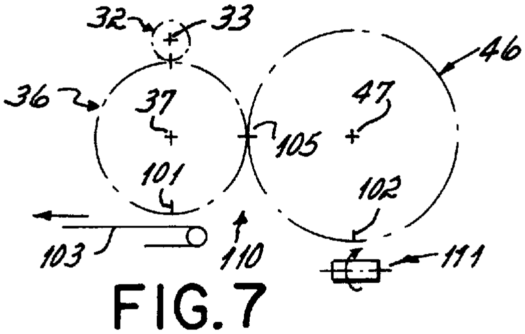

Alternative Embodiment—FIG. 7

This embodiment is similar to that of FIG. 6 and illustrates a rotary pouch knife and transfer apparatus 110 having knife hubs 32, 36, transfer wheel 46, release station 105, drop off points 101, 102 and conveyors 103, 111. Conveyor 103 is a direct drop conveyor, preferably a bucket covneyor, operating in a transport direction parallel to axes of rotation 33, 37, 47, while conveyor 111 is a single or multiple lane conveyor operating in a transport direction parallel to axes 33, 37 and 47. Conveyor 111 receives pouches primarily in shingled or single orientation for wheel 46 for transport to downstream combining, orienting or packing stations or cartoners.

Figure 8:
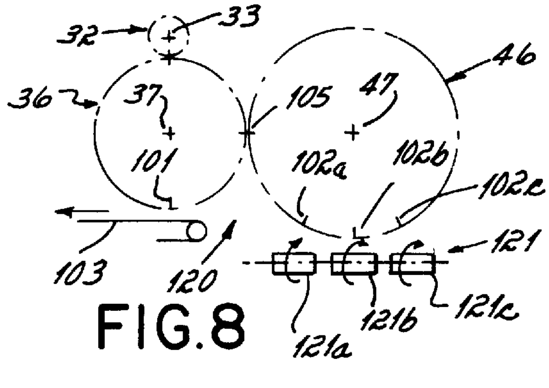

Alternative Embodiment—FIG. 8

This embodiment is similar to that of FIGS. 6 and 7 , and illustrates a rotary pouch knife and transfer apparatus 120 having the components of FIG. 7 except for multiple lane drop off conveyor 121 in place of conveyor 111. Conveyor 121 comprises a multiple lane conveyor for receiving pouches in multiple lanes 121*a*, 121*b* and 121*c* from respective drop off points 102*a*, 102*b* and 102*c*. Conveyor 121 transports lanes of pouches in a downstream direction parallel to the axes of rotation 33, 37, 47 to further pouch combining, orientation or packing stations or cartoner(s).

Figure 9:
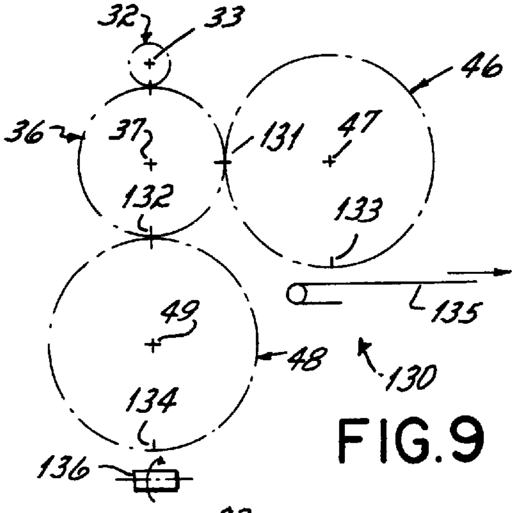

Alternative Embodiment—FIG. 9

FIG. 9 illustrates an embodiment of a rotary pouch knife and transport apparatus 130 including minor and major knife hubs 32, 36, transfer wheels 46, 48, respective release stations 131, 132 for pouch release from knife hub 36 to respective transfer wheels 46, 48, drop off stations 133, 134 and respective axes of rotation 33, 37, 47 and 49.

A first conveyor 135 is a direct drop bucket conveyor, or other direct drop conveyor, for receiving pouch stacks in pre-selected count in conveyor buckets for transport, in a direction perpendicular to axes of rotation 33, 37, 47 and 49 to a downstream cartoner (not shown).

A second conveyor 136 is disposed for receiving pouches from transfer wheel 48 and transporting pouches in a direction parallel to axes of rotation 33, 37, 47 and 49 to further pouch combining, orienting or packing stations or cartoner (s).

Figure 10:
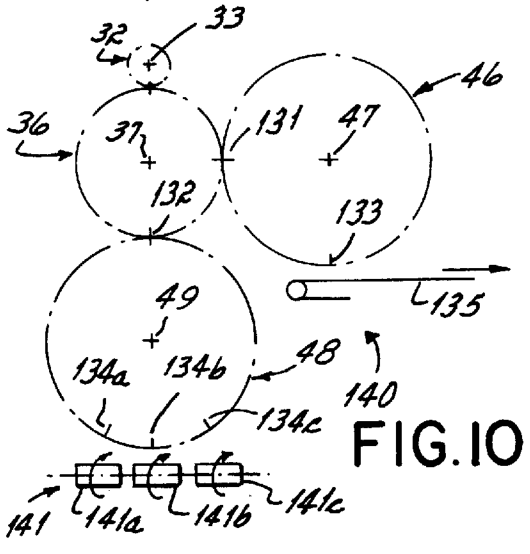

Alternative Embodiment—FIG. 10

This embodiment is similar to that of FIG. 9 with the exception that in the rotary pouch knife and transfer apparatus 140, a multiple lane conveyor 141 having three lanes 141*a*, 141*b* and 141*c* in place of conveyor 136 (FIG. 9) is provided. In this embodiment, transfer wheel 48 has three drop off stations 134*a*, 134*b* and 134*c* serving respective conveyor lanes 141*a*, 141*b* and 141*c*. These lanes transport pouches in shingled or single orientation in a direction parallel to axes of rotation 33, 37, 47 and 49 to downstream combining, orientation, or packing stations or cartoners.

Accordingly, from the foregoing, it will be appreciated that the invention provides an improved rotary pouch knife and transfer apparatus where two or more cartoning operations can be served, at least one at the relatively high speed of a direct drop transfer, such as a direct drop bucket conveyor, and without downstream transfer or other handling devices prior to the cartoners.

It will also be appreciated that the invention is particularly useful in increasing the operational options available in a pouch operation. For example, where a transfer wheel carries cut off pouches in 10 inch centers to a direct drop bucket conveyor where pouch stacks are formed on five inch centers, the knife, transfer wheel and conveyor speeds can be adjusted for greater throughput, including releasing pouches from the knife to the transfer wheel on five inch centers and adjusting conveyor and wheel speeds where necessary so total throughput is increased. This is useful, for example, where the other conveyor or its downstream combining, orienting or packing station or cartoner is slowed or out of service.

Alternately, if the cartoner fed by the direct drop bucket conveyor is slowed or stopped, throughput to the other conveyor can be increased, thereby accommodating more of the pouch machine's output and reducing any pouch machine output accumulation during the down time. This is all achieved through use of the same rotary knife and transfer apparatus without the need to rethread another knife apparatus with its attendant cost or floor space, or to redirect the output of a prior single knife to another cartoner.

It will be appreciated that each embodiment includes a major knife hub, two pouch drop off points or stations and two or more conveyors receiving pouches from the drop offs where at least one conveyor is a direct drop conveyor operating in an initial direction perpendicular to the knife hub axis and the axes of rotation of one or more transfer wheels.

It should also be appreciated that when considering the operation of the knife hub 36, depending on the particular application, the release or drop off of pouches therefrom is not necessarily directly to a conveyor, but may be to one or more transfer wheels or other devices.

Also, where two direct drop bucket conveyors are used to feed two cartoners, as in the preferred embodiment of FIGS. 1–3, the single rotary knife and transfer is easily capable of handling the full pouch machine output, at today's pouching and cartoning speeds, reducing the otherwise anticipated need for additional knives, accumulation or handling equipment.

These and other embodiments and modifications will become readily apparent to those of ordinary skill in the art without departing from the scope of this invention and the applicant intends to be bound only by the claims appended hereto.

What is claimed is:

1. A pouch handling apparatus for severing individual pouches from a pouch train and transferring individual pouches from said train to separate downstream pouch handling devices, said apparatus comprising:

a rotary pouch severing knife rotating about an axis;

at least two conveyors for receiving individual pouches after severing thereof by said knife;

pouch transfer apparatus comprising at least two drop off points for delivering pouches to at least one of said two pouch conveyors; and wherein at least one of said conveyors is a direct drop conveyor operably oriented to transport severed pouches from one drop off point to a downstream pouch handling apparatus;

said direct drop bucket conveyor extending from said transfer apparatus in a direction perpendicular to said axis.

2. Apparatus as in claim 1 wherein said pouch transfer apparatus has an axis of rotation parallel to the axis of rotation of said knife and another one of said conveyors is oriented to transport pouches in a direction parallel to said axis of rotation of said transfer apparatus.

3. Apparatus as in claim 2 wherein said direct drop conveyor transports pouches in a direction perpendicular to said axis of rotation of said transfer apparatus.

4. Apparatus as in claim 1 wherein said pouch transfer apparatus comprises two pouch transfer wheels and each pouch conveyor comprises a direct drop bucket conveyor having a plurality of buckets transporting severed pouches from said respective drop off points in stacks of pouches to respective pouch cartoners.

5. Apparatus as in claim 4 wherein said transfer wheels each have parallel axes of rotation and wherein said direct drop bucket conveyors each transport stacks of pouches in parallel directions.

6. Apparatus as in claim 5 wherein said parallel transport directions of said direct drop bucket conveyors are perpendicular to said axes of rotation of said transfer wheels.

7. Apparatus as in claim 1 wherein said two conveyors transport dropped off pouches in opposite directions away from said apparatus.

8. Apparatus as in claim 1 wherein both said conveyors are direct drop bucket conveyors having a plurality of buckets each receiving stacks of pouches from one of said drop off points.

9. Apparatus as in claim 8 wherein said transfer apparatus has an axis of rotation parallel to the axis of rotation of said knife and wherein said two conveyors each transport pouches in a direction perpendicular to said axis of rotation.

10. Apparatus as in claim 1 wherein said transfer apparatus includes a first transfer wheel having an axis of rotation parallel to the axis of rotation of said knife and defining a pouch drop off point for dropping pouches onto a first conveyor for transport in a direction parallel to said transfer wheel axis of rotation, and said transfer apparatus also includes a knife hub for dropping other pouches onto a direct drop conveyor operating in a direction perpendicular to said axis of rotation of said knife.

11. Apparatus as in claim 10 wherein said first conveyor is a multiple lane conveyor.

12. Apparatus as in claim 1 wherein said transfer apparatus includes two transfer wheels rotatable about axes of rotation which are parallel, each wheel receiving pouches from said knife and each defining a pouch drop off point onto a respective conveyor.

13. Apparatus as in claim 12 wherein another of said conveyors operates in a direction parallel to said axes of rotation and said direct drop off conveyor operates in a direction perpendicular to said axes of rotation.

14. Apparatus as in claim 13 wherein said other conveyor is a multiple lane conveyor.

15. A pouch severing and transfer apparatus for severing individual pouches from a pouch train and transferring several pouches from said train to separate downstream pouch handling devices, said apparatus comprising:

a rotary pouch severing knife including at least one major knife hub rotatable about an axis of rotation;

at least one pouch transferring wheel for receiving pouches from said hub and rotatable about an axis of rotation;

a first release point defined on said knife hub where pouches are released onto said wheel;

a first conveyor;

a drop off point on said wheel from where pouches are released from said wheel onto said first conveyor;

a drop off point on said knife hub from where pouches are released from said knife hub;

a second conveyor for transporting pouches released from said knife hub drop off point; and wherein at least one of said conveyors is a direct drop conveyor having buckets for receiving and transporting pouches in stacks to a cartoner;

said direct drop conveyor extending from said apparatus in a direction perpendicular to the axis of rotation of said knife.

16. Apparatus as in claim 15 wherein both said conveyors are direct drop bucket conveyors for transporting several pouches in respective stacks to two respective cartoners.

17. Apparatus as in claim 16, wherein both said conveyors transport pouches in a direction perpendicular to said axes of rotation.

18. Apparatus as in claim 17 wherein both said conveyors are parallel along an initial portion of an operation run of each.

19. Apparatus as in claim 15 further including a second transfer wheel operating about an axis and oriented to receive pouches for said knife drop off point and to transfer pouches to said second conveyor.

20. Apparatus as in claim 19 wherein both said conveyors are direct drop bucket conveyors having buckets receiving stacks of pouches and transporting stacks of pouches to separate cartoners.

21. A pouch severing and transfer apparatus for receiving a train of pouches, severing pouches from the train and delivering pouches to downstream handling devices, said apparatus comprising:

a knife for receiving a train of pouches and severing pouches from said train;

said knife including a major knife hub rotating about an axis, said hub transferring severed pouches from a cut off station associated with said knife to one of at least two release stations where several pouches are released for further transfer;

two pouch conveyors;

said apparatus also including at least two drop off points from where pouches are dropped onto at least one of said two conveyors;

at least one of said conveyors being a direct drop conveyor for transporting stacks of pouches to a cartoner;

said direct drop conveyor extending away from said apparatus in a direction perpendicular to the axis of said knife.

22. Apparatus as in claim 21 wherein one of said release stations also comprises one of said drop off points.

23. Apparatus as in claim 22 further including a transfer wheel proximate a first release station for receiving pouches therefrom and transferring pouches to a first drop off point.

24. Apparatus as in claim 23 wherein said transfer wheel rotates about an axis of rotation and drops off pouches onto said at least one direct drop conveyor operating in a direction perpendicular to said axis.

25. Apparatus as in claim 23 wherein said transfer wheel rotates about an axis of rotation and drops off pouches onto a conveyor operating in a direction parallel to said axis.

26. Apparatus as in claim 24 wherein both conveyors are direct drop bucket conveyors for feeding pouches in stacks respectively to two respective cartoners.

27. Apparatus as in claim 26 wherein both conveyors transport stacks of pouches in a direction perpendicular to said axis of rotation of said transfer wheel axis.

28. Apparatus as in claim 21 further including two transfer wheels rotatable about two respective parallel axes of rotation, one wheel operably proximate a first release station to receive pouches therefrom and another wheel operably proximate a second release station to receive therefrom other pouches than those received from the first release station by said one transfer wheel, each wheel having at least one respective drop off point.

29. Apparatus as in claim 28 wherein both conveyors are direct drop bucket conveyors receiving and feeding stacks of pouches to separate cartoners.

30. Apparatus as in claim 29 wherein both conveyors operate in a direction perpendicular to axes of rotation of said transfer wheels.

31. Apparatus as in claim 21 wherein said at least one conveyor is a direct drop bucket conveyor.

32. Apparatus for severing products from a series of pouches in a pouch train, and transferring severed pouches from said train to separate downstream pouch handling devices, said apparatus comprising:

a pouch severing knife rotating about an axis of rotation;

two pouch conveyors;

pouch transfer apparatus comprising at least two drop off points for delivering pouches to at least one of said two pouch conveyors;

wherein said two conveyors are situated for transport of pouches away from said knife in a direction perpendicular to the axis of rotation of the pouch knife; and wherein at least one of said two conveyors is a bucket conveyor having a plurality of buckets thereon receiving pouches in stacks and transporting said stacks in a direction perpendicular to said axis of rotation.

33. A method of packaging pouches including the steps of:

severing pouches from a train of pouches in a rotary knife and transfer apparatus wherein said knife rotates about an axis;

transferring pouches selectively to at least two discharge positions from said knife and transfer apparatus;

feeding selected pouches from at least one of said discharge positions onto a direct drop conveyor for transport to a cartoner;

feeding pouches other than said selected pouches from another of said discharge positions to a second conveyor; and operating said direct drop conveyor in a direction perpendicular to said axis of rotation of said knife.

* * * * *